(12) United States Patent
Pank

(10) Patent No.: US 6,869,528 B2
(45) Date of Patent: Mar. 22, 2005

(54) FILTERING SYSTEM FOR RUNOFF WATER

(76) Inventor: Thomas E. Pank, 10546 Harp Rd., Walkersville, MD (US) 21793

( * ) Notice: Subject to any disclaimer, the term of this patent is extended or adjusted under 35 U.S.C. 154(b) by 0 days.

(21) Appl. No.: 10/040,611

(22) Filed: Jan. 9, 2002

(65) Prior Publication Data

US 2002/0117435 A1 Aug. 29, 2002

Related U.S. Application Data

(60) Provisional application No. 60/271,065, filed on Feb. 26, 2001.

(51) Int. Cl.[7] ............................................. B01D 24/02
(52) U.S. Cl. ...................... 210/170; 210/283; 210/286; 210/290
(58) Field of Search ................................. 210/170, 254, 210/283, 284, 285, 286, 290, 338, 342, 454, 433.1, 163, 164; 404/4, 5

(56) References Cited

U.S. PATENT DOCUMENTS

| | | | | |
|---|---|---|---|---|
| 210,113 A | | 11/1878 | Gates | 210/433.1 |
| 300,612 A | * | 6/1884 | Kester | 210/286 |
| 575,478 A | * | 1/1897 | Haefner | 210/338 |
| 620,316 A | * | 2/1899 | Haselden | 210/290 |
| 631,128 A | | 8/1899 | Ricketts | 210/434 |
| 745,497 A | | 12/1903 | Hood | 210/433.1 |
| 789,968 A | | 5/1905 | Ernst | 210/286 |
| 945,989 A | * | 1/1910 | Sponenburger | 210/433.1 |
| 988,391 A | * | 4/1911 | Shillington | 210/290 |
| 1,033,329 A | * | 7/1912 | Laughlin | 210/433.1 |
| 1,090,283 A | * | 3/1914 | Crandall | 210/286 |
| 1,140,726 A | * | 5/1915 | Wooden | 210/286 |
| 1,793,080 A | * | 2/1931 | Glover | 210/433.1 |
| 1,956,132 A | * | 4/1934 | Pholnberb | 210/433.1 |
| 2,405,838 A | * | 8/1946 | Lawson et al. | 210/338 |
| 2,723,035 A | * | 11/1955 | Anderson | 210/434 |
| 2,742,160 A | | 4/1956 | Fogwell | |
| 3,807,570 A | | 4/1974 | Allan | |
| 4,045,346 A | | 8/1977 | Swaskey | |
| 4,261,823 A | | 4/1981 | Gallagher et al. | |
| 4,297,219 A | | 10/1981 | Kirk et al. | |
| 4,708,792 A | | 11/1987 | Takarabe | |
| 4,752,396 A | | 6/1988 | Schmitt | |
| 4,861,465 A | | 8/1989 | Augustyniak | |
| 4,985,148 A | | 1/1991 | Monteith | |
| 5,122,270 A | | 6/1992 | Ruger et al. | |

(List continued on next page.)

Primary Examiner—Christopher Upton
(74) Attorney, Agent, or Firm—William D. Hall

(57) ABSTRACT

The present invention filters runoff water containing oil and an emulsion of oil and water. A tank receives the inlet water and feeds it to a reservoir which in turn feeds the water to the cylindrical filter cells. The water passing through the filter cells is received by a manifold which feeds the clean water to an outlet. However, when the runoff water has a high rate of flow the reservoir soon overflows and the excess water flows directly to an outlet. The reservoir may be either above or below the filter cells. If above, the water entering the inlet flows downward to a reservoir which is perforated to provide water to the filter cells. If, however, the reservoir is below the filter cells it has a perforated top which feeds the filter cells. The water in the reservoir is under pressure. The filter cells may be cylindrical. They have an inner vertical cylindrical passageway surrounded by one or more cylindrical layers. One filtering media is in said inner passageway. Each cylindrical layer provides a different filtering media. In one form of the invention the filtering media in the inner passageway is a coarse media and the filtering media in the other cylindrical layer or layers is a finer media. Each layer of the filter bounded by a porous barrier. Surrounding, and spaced from, the outermost barrier is an outer wall. The space between the outermost barrier and the wall forms a drain for feeding the filtered liquid to an output.

44 Claims, 15 Drawing Sheets

U.S. PATENT DOCUMENTS

| | | |
|---|---|---|
| 5,133,619 A | 7/1992 | Murfae et al. |
| 5,160,039 A | 11/1992 | Colburn |
| 5,223,154 A | 6/1993 | MacPherson, Jr. et al. |
| 5,269,921 A | 12/1993 | Ruger et al. |
| 5,431,813 A * | 7/1995 | Daniels ............... 210/286 |
| 5,433,845 A | 7/1995 | Greene et al. |
| 5,480,254 A | 1/1996 | Autry et al. |
| 5,511,904 A | 4/1996 | Van Egmond |
| 5,531,888 A | 7/1996 | Geiger et al. |
| 5,562,819 A | 10/1996 | Turner, Jr. et al. |
| 5,632,889 A | 5/1997 | Tharp |
| 5,643,445 A | 7/1997 | Billias et al. |
| 5,650,065 A | 7/1997 | Sewell |
| 5,707,527 A * | 1/1998 | Knutson et al. ........... 210/170 |
| 5,725,760 A | 3/1998 | Monteith |
| 5,744,048 A | 4/1998 | Stetler |
| 5,759,415 A | 6/1998 | Adams |
| 5,770,057 A | 6/1998 | Filion |
| 5,779,888 A | 7/1998 | Bennett |
| 5,788,848 A | 8/1998 | Blanche et al. |
| 5,814,216 A | 9/1998 | Filion |
| 5,820,762 A | 10/1998 | Bamer et al. |
| 5,849,181 A | 12/1998 | Monteith |
| 5,904,842 A | 5/1999 | Billias et al. |
| 5,958,226 A | 9/1999 | Fleischmann |
| 6,027,639 A * | 2/2000 | Lenhart, Jr. et al. ........ 210/170 |
| 6,062,767 A | 5/2000 | Kizhnerman et al. |
| 6,068,765 A | 5/2000 | Monteith |
| 6,077,448 A | 6/2000 | Tran-Quoc-Nam et al. |
| 6,080,308 A | 6/2000 | Williamsson |
| 6,086,756 A | 7/2000 | Roy |
| 6,086,758 A | 7/2000 | Schilling et al. |
| 6,096,200 A | 8/2000 | Bennett |
| 6,099,729 A | 8/2000 | Cella et al. |
| 6,190,545 B1 | 2/2001 | Williamson |
| 6,200,484 B1 | 3/2001 | McInnis |
| 6,217,757 B1 * | 4/2001 | Fleischmann ................ 404/4 |
| 6,241,881 B1 | 6/2001 | Pezzaniti |
| 6,251,269 B1 | 6/2001 | Johnson et al. |
| 6,270,653 B1 | 8/2001 | Gochlin et al. |
| 6,315,897 B1 | 11/2001 | Maxwell |

* cited by examiner

FILTERING SYSTEM FOR RUNOFF WATER

I claim the benefit of prior copending provisional application Ser. No. 60/271,065, filed Feb. 26, 2001, entitled Filter, of Thomas E. Pank.

BACKGROUND OF THE INVENTION

Parking lots, the roads of filling stations and other places have oil and/or an emulsion of oil and water in the runoff water. These oils have been removed from the runoff water by a two stage process. Such a process includes first gravity separation which removes all oil other than the emulsion of oil and water from the runoff water, and secondly a filter for removing emulsion.

The present invention is an improved filtering system for use as the second of the above two stages.

Cylindrical filters, having two or more concentric layers, through which the liquid to be filtered pass in a radial direction are old, see U.S. Pat. No. 2,742,160 to Fogwell, U.S. Pat. No. 3,442,391 to Bozek, and U.S. Pat. No. 5,811,002 to Felber. Moreover, patents disclosing filters for drainage water include U.S. Pat. No. 6,027,639 to Lenhart, Jr. and U.S. Pat. No. 6,190,545 to Williamson.

SUMMARY OF THE INVENTION

The runoff water which is processed by the present invention may vary from a very low rate of flow to a very high rate of flow. That portion of the runoff water that is within the capacity of this filtering mechanism is fed to a reservoir and from the reservoir to plural cylindrical filter cells where the runoff water is filtered and fed to an outlet.

However, when the rate of flow of the runoff water exceeds the capacity of the filtering system it may follow a direct path from the inlet to an outlet. To carry out the foregoing, a tank receives the inlet water and feeds it to a reservoir which in turn feeds the water to the cylindrical filter cells. The water passing through the filter cells is received by a manifold which feeds the clean water to an outlet. However, when the runoff water has a high rate of flow the reservoir soon overflows and the excess water flows directly to an outlet.

The reservoir may be either above or below the filter cells. If above, the water entering the inlet flows downward to a reservoir which is perforated to provide water to the filter cells. If, however, the reservoir is below the filter cells, it has a perforated top which feeds the filter cells. The water in the reservoir is under pressure. The pressure is sufficient to force the water through the filter cells to the outlet. The pressure may be obtained by confining the water in a column that extends alongside the filter cells.

The filter cells are preferably concentric cylindrical layers surrounding, in a horizontal plane, a central cell. Each layer is an individual filter cell that surrounds a central axis and has its own individual inlet, its own individual outlet and its own filtering media between its inlet and its outlet. The inlets and outlets extend vertically along the cells. The inlets are fed by a reservoir and the fluids in the outlets are received by a manifold. Each layer is separated from adjacent layers by a barrier.

Each layer of the filter is bounded by a porous barrier. Surrounding, and spaced from, the outermost barrier is an outer wall. The space between the outermost barrier and the wall forms a drain for feeding the filtered liquid to an output.

DETAILED DESCRIPTION OF THE PREFERRED FORM OF THE INVENTION

Parking lots and other paved areas build up contaminants such as oils during everyday use. During a storm, these oils are carried into the storm drain by the stormwater runoff, which is usually discharged to a river or stream. The present invention is a system for removing oils from stormwater runoff by using filtration.

The conventional prior art relies on gravity separation to remove oils from stormwater runoff. Free oils can be removed by this method, but emulsified and dissolved oils cannot. The present invention makes use of a fine filter media to trap those oils that cannot be removed in a conventional gravity separator. Used in conjunction with a gravity separator such as those described in U.S. Pat. Nos. 5,746,911 and 8,264,835, both to Pank, the present invention comprises a two stage process for the removal of oils from runoff water.

FIGS. 1 to 6 illustrate the preferred form of the invention.

Figure 5:
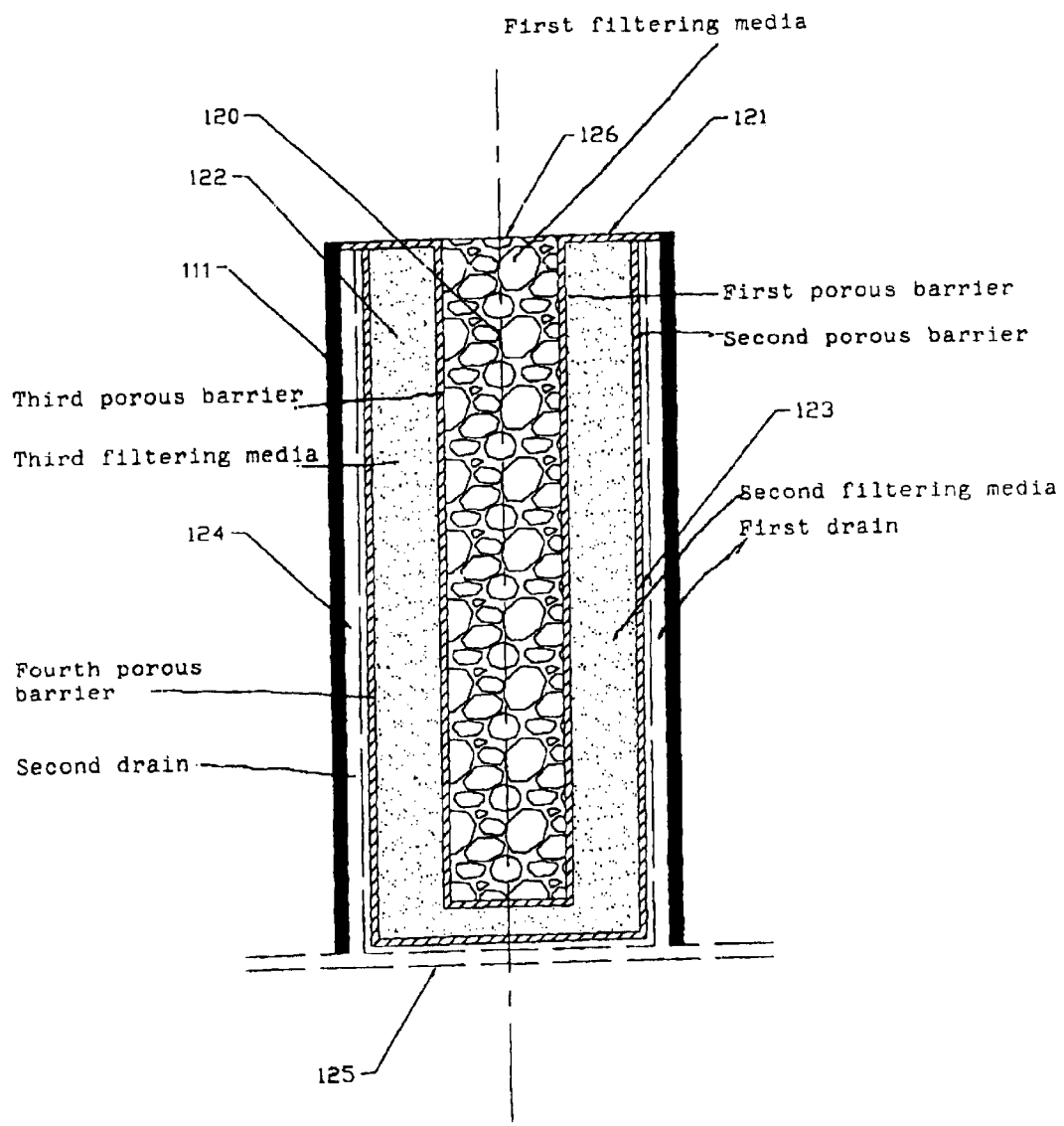
FIG. 5 is a cross-sectional view of each of the three layers 110, 110B of FIG. 4.
Figure 6:
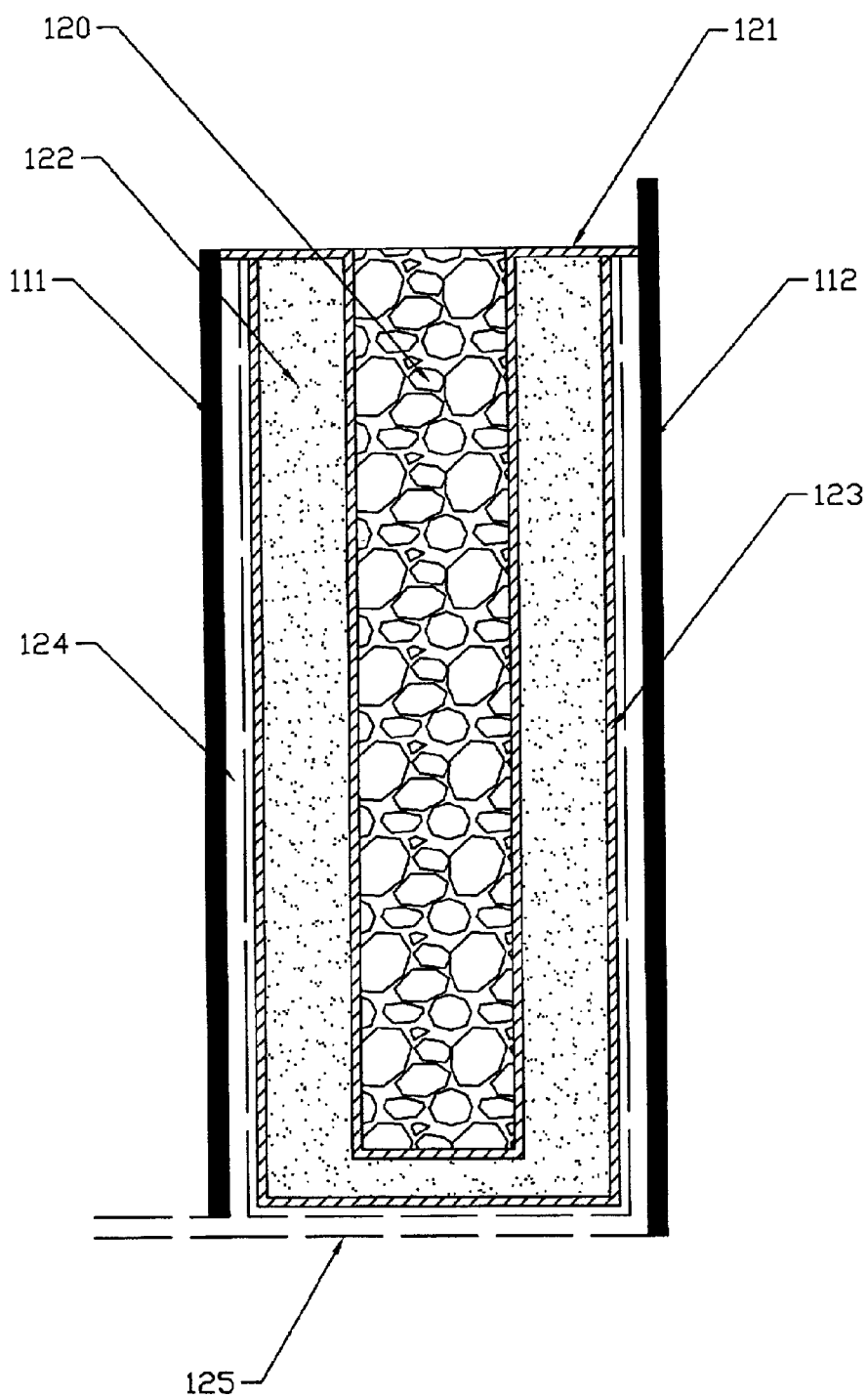
FIG. 6 is a cross-sectional view of each of the layer 110A of FIG. 4.

The new filter has two opposing sides, one of which sides comprises the upper ends of the cells 110, 110A and 110B of FIGS. 5 and 6 and the other of which sides comprises the lower end of said cells 110, 110A and 110B.

Figure 1:
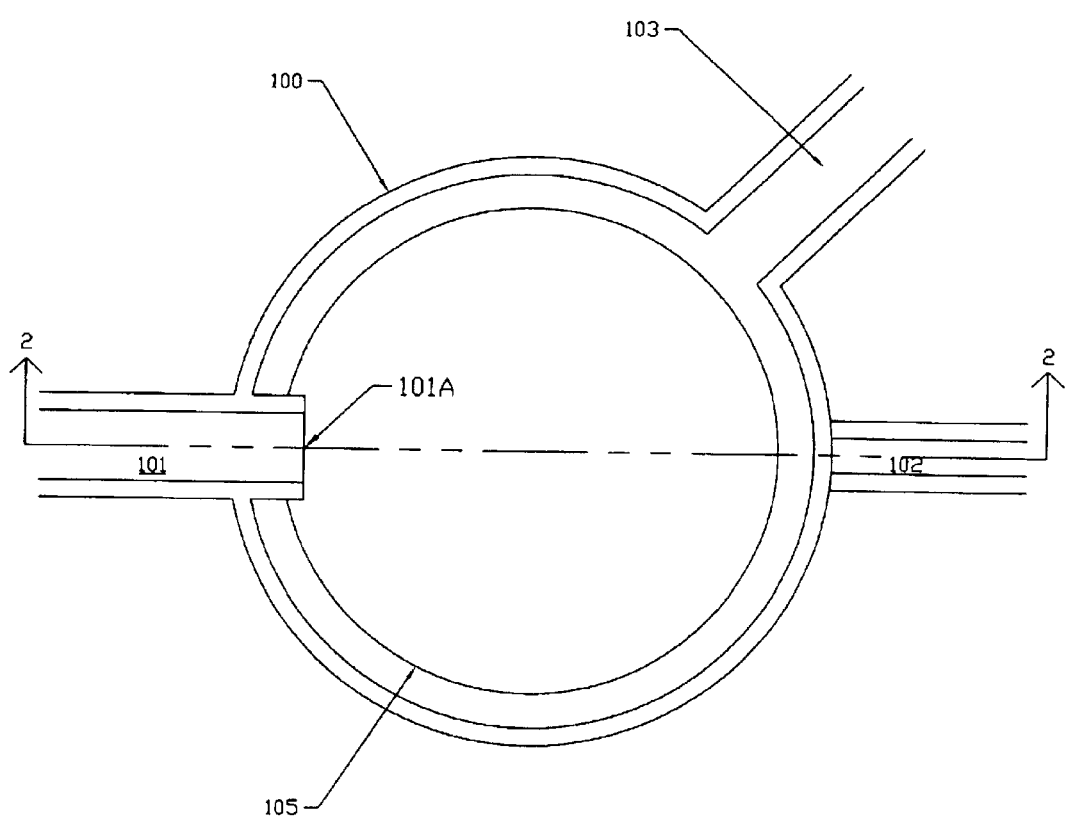
FIG. 1 is a plan view of the preferred form of the invention.
Figure 2:
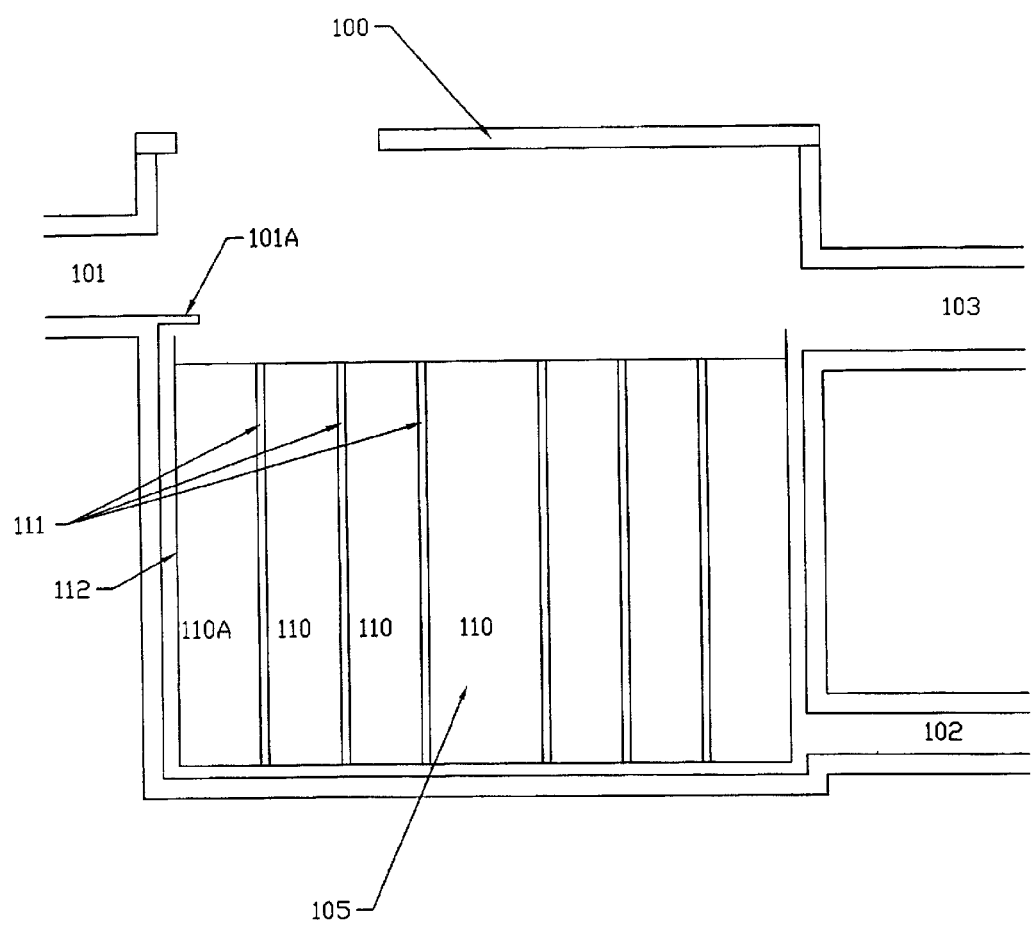
FIG. 2 is a sectional view of the preferred form of the invention taken along line 2—2 of FIG. 1.

In FIGS. 1 and 2, there is a tank 100 that has an inlet conduit such as pipe 101, a clean water outlet conduit such as pipe 102, and an overflow outlet conduit such as pipe 103. The clean water outlet pipe 102 is at a substantially lower elevation than the inlet pipe 101, and the overflow outlet pipe 103 is at the same elevation as the inlet pipe 101. There is a spillway 101A at the end of inlet pipe 101 that extends to the edge of the filter mechanism 105. The clean water outlet conduit 102 and overflow outlet conduit 103 may be kept separate to maintain segregated waste streams, or may be combined into a single outlet conduit.

Figure 3:
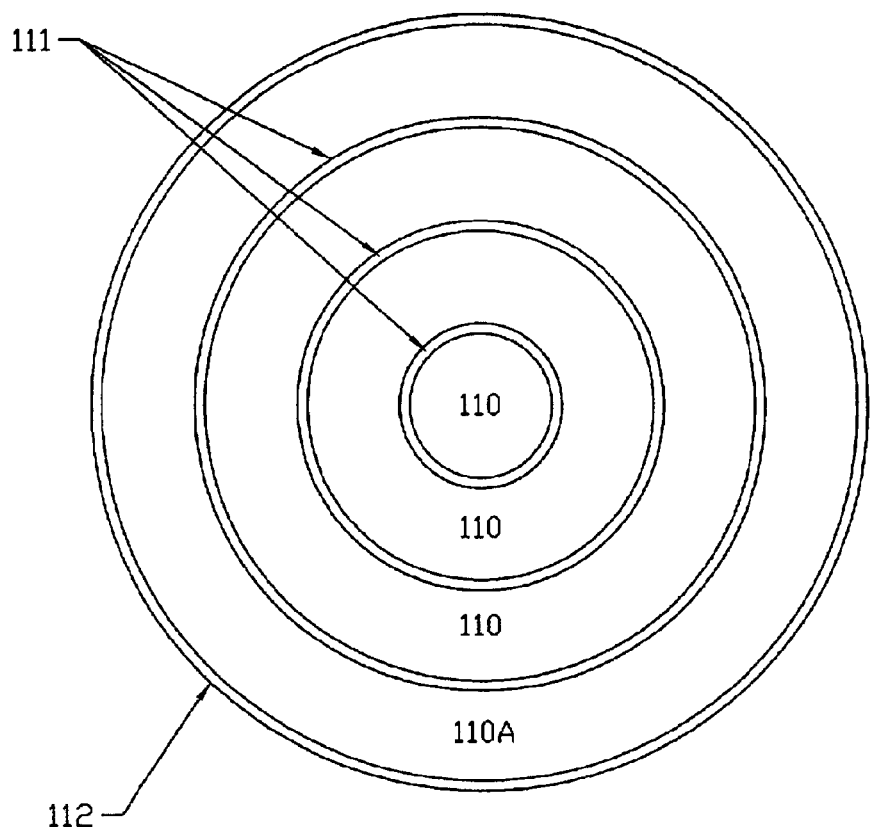
FIG. 3 is a plan view of the filter mechanism 105 for the preferred form of the invention.
Figure 4:
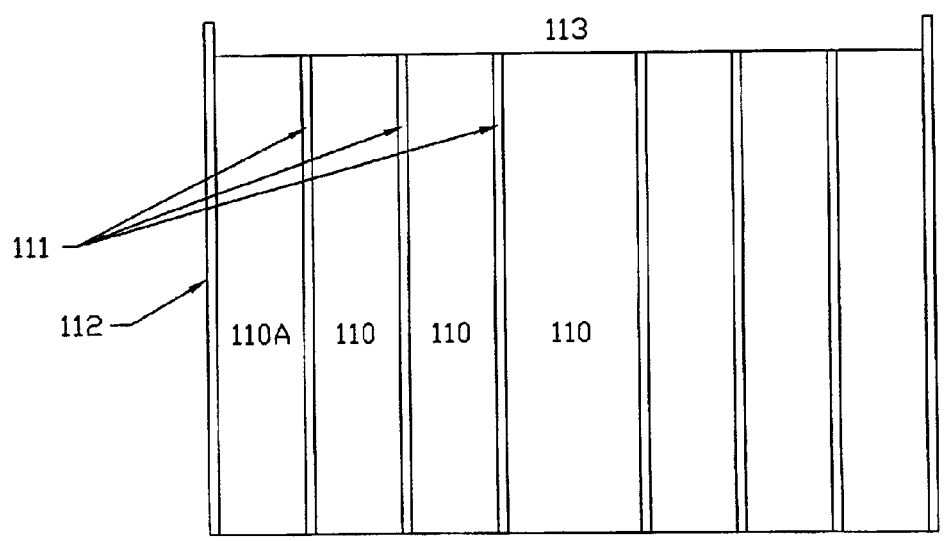
FIG. 4 is a cross-sectional view of the filter mechanism.

The filter mechanism 105 is shown in FIGS. 3 and 4. The filter mechanism is divided into concentric filter cells 110 and 110A by inner walls 111, and surrounded by outer wall 112. Outer wall 112 is taller than inner walls 111. A reservoir 113, with one side, in this case the bottom side, perforated. The reservoir is formed by outer wall 112 and the tops of the filter cells 110 and 110A.

Each interior filter cell 110 is constructed as shown in FIG. 5. The inner walls 11 constitute the vertical boundaries of the cell, and perforated plate 125 constitutes the floor. The entire filter mechanism 105 is held above the floor of tank 100 in any suitable way. A drain 124 is fastened along the inside of the inner walls 111. The drain is bounded by barrier 123, which separates the drain 124 from a fine filter media 122. Barrier 123 is a geotextile or similar device that is fine enough to retain fine filter media 122, but porous enough to allow water to pass through it. A second barrier 121 separates the fine filter media 122 from a coarse material 120. Like barrier 123, barrier 121 is also a geotextile or similar device that is fine enough to retain fine filter media 122, but porous enough to allow water to pass through it. Barrier 121 extends along the top of the fine filter media 122 to the inner wall 111.

The tank 100 is a large chamber. Inside of the large chamber is a smaller chamber 112 containing the filter cells 110 and 110A. Each filter cell, such as those shown in FIGS. 5 and 6, has a first passageway along the vertical center line of the cell and containing the first filter media 120. A second passageway, is in the form of drain 124. The fine filtering media comprises the second filtration media.

The exterior filter cell 110A is shown in FIG. 6. An inner wall 111 forms one vertical boundary, while the outer wall 112 forms the other vertical boundary. Perforated plate 125, drain 124, barrier 123, fine filter media 122, barrier 121, and coarse material 120 are arranged as they are in the aforementioned interior filter cell 110.

Operation of the Preferred Form

When the runoff entering inlet pipe 101 has a low rate of flow, the water is passed from spillway 101A into reservoir 113 above filter mechanism 105. Because the oil entering the system is emulsified or dissolved, the oil does not remain on top of the water in reservoir 113, but is instead mixed throughout the water. From reservoir 113, the water flows into coarse material 120. Coarse material 120 has a large volume of voids and provides little resistance to the flow of water, thus the water is distributed evenly throughout coarse material 120.

As coarse material 120 becomes saturated, the runoff water will penetrate barrier 121 and enter fine filter media 122. Fine filter media 122 provides significantly more resistance to flow than does coarse material 120. Furthermore, the finer particles create a more tortuous flow path, allowing for longer contact time between the runoff water and the fine filter media 122, and therefore more efficient pollutant removal. As the fine filter media 122 slowly becomes saturated, the filtered runoff water will then penetrate barrier 123 and enter drain 124.

Drain 124 is simply an open space that allows the water to flow down along interior wall 111 or outer wall 112 to perforated plate 125. The water flows through the perforations in plate 125 and back into tank 100. From tank 100, the water flows between spacers 106 and enters the clean water outlet pipe 102. The clean water outlet pipe 102 delivers the filtered runoff water to a sewer or stream.

When runoff water enters the inlet pipe 101 at a high rate of flow, the fine filter media 122 restricts the flow through filter cells 110 and 110A, and therefore restricts the flow through filter mechanism 105. In this case, the overflow outlet pipe 103 accepts the excess water from the surface of the reservoir 113 through overflow inlet 103A. Overflow pipe 103 delivers the unfiltered water to a sewer or stream. This can be the same sewer or stream that clean water outlet pipe 102 discharges to, or it can be a different discharge point.

Detailed Description of a First Modified Form of the Invention

As an alternative to the use of multiple concentric filter cells, the present invention can be used with a single filter cell. In this arrangement, the tank 100, inlet pipe 101 with spillway 101A, clean water outlet pipe 102, and overflow outlet pipe 103 with inlet 103A are unchanged, and are arranged as shown in FIGS. 1 and 2 for the preferred form of the invention. The filter mechanism 105 is positioned in the same place within the invention, but the interior components are altered to create a single filter cell.

Figure 7:
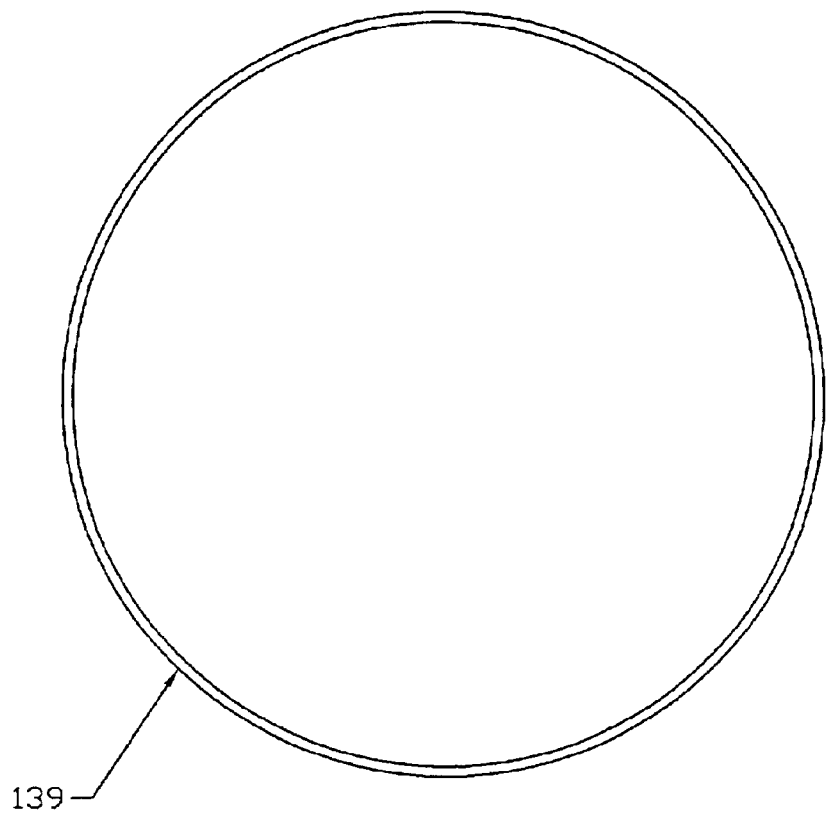
FIG. 7 is a plan view of the filter mechanism 105 for a First Modified Form of the Invention.
Figure 8:
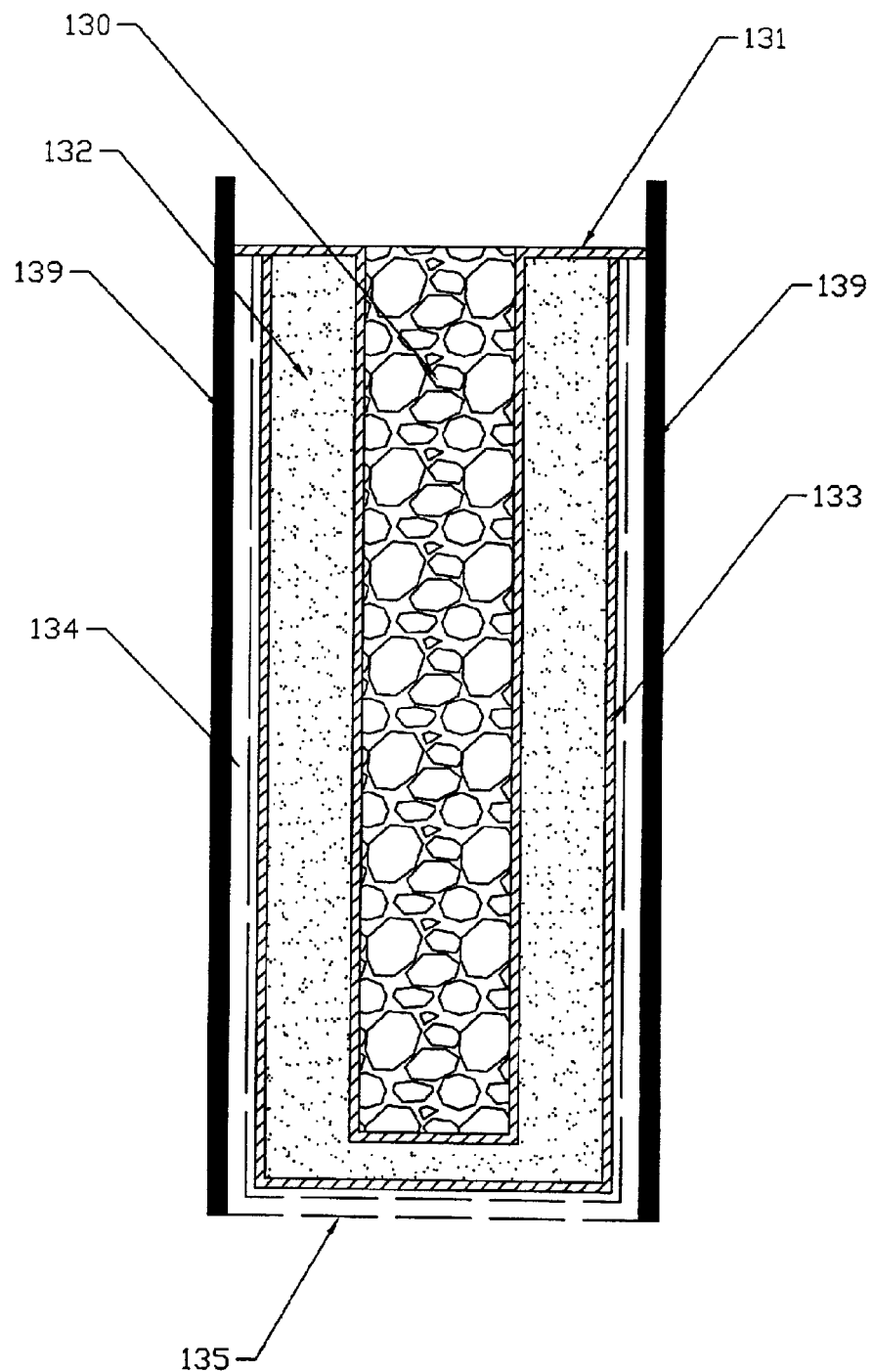
FIG. 8 is a sectional view of the filter mechanism of the First Modified Form of the Invention.

FIGS. 7 and 8 illustrate this First Modified Form of the present invention. The filter mechanism 105 is bounded by outer wall 131, which also creates reservoir 113. The outer wall 139 contains the single filter cell as shown in FIG. 8, and perforated plate 135 constitutes the floor. The entire filter mechanism 105 is again raised above the floor of tank 100 in any suitable way. A drain 134 is fastened along the inside of the outer wall 139. The drain is bounded by barrier 133, which separates the drain 134 from a fine filter media 132. Barrier 133 is a geotextile or similar device that is fine enough to retain fine filter media 132, but porous enough to allow water to pass through it. A second barrier 131 separates the fine filter media 132 from a coarse material 130. Like barrier 133, barrier 131 is also a geotextile or similar device that is fine enough to retain fine filter media 132, but porous enough to allow water to pass through it. Barrier 131 extends along the top of the fine filter media 132 to the outer wall 139.

Operation of the First Modified Form

When the runoff entering inlet pipe 101 has a low rate of flow, the water is passed from spillway 101A into reservoir 113 above filter mechanism 105. Because the oil entering the system is emulsified or dissolved, the oil does not remain on top of the water in reservoir 113A, but is instead mixed throughout the water. From reservoir 113A, the water flows into coarse material 130. Coarse material 130 has a large volume of voids and provides little resistance to the flow of water, thus the water is distributed evenly throughout coarse material 130.

As coarse material 130 becomes saturated, the runoff water will penetrate barrier 131 and enter fine filter media 132. Fine filter media 132 provides significantly more resistance to flow than does coarse material 130. Furthermore, the finer particles create a more tortuous flow path, allowing for longer contact time between the runoff water and the fine filter media 132, and therefore more efficient pollutant removal. As the fine filter media 132 slowly becomes saturated, the filtered runoff water will then penetrate barrier 133 and enter drain 134.

Drain 134 is simply an open space that allows the water to flow down along outer wall 139 to perforated plate 135. The water flows through the perforations in plate 135 and back into tank 100. From tank 100, the water flows between spacers 106A and enters the clean water outlet pipe 102. The clean water outlet pipe 102 delivers the filtered runoff water to a sewer or stream.

When runoff water enters the inlet pipe 101 at a high rate of flow, the fine filter media 132 restricts the flow through the single filter cell, and therefore restricts the flow through filter mechanism 105. In this case, the overflow outlet pipe 103 accepts the excess water from the surface of the reservoir 113 through overflow outlet 103A. Overflow pipe 103 delivers the unfiltered water to a sewer or stream. This can be the same sewer or stream that clean water outlet pipe 102 discharges to, or it can be a different discharge point.

Detailed Description of a Second Modified Form of the Invention

Figure 9:
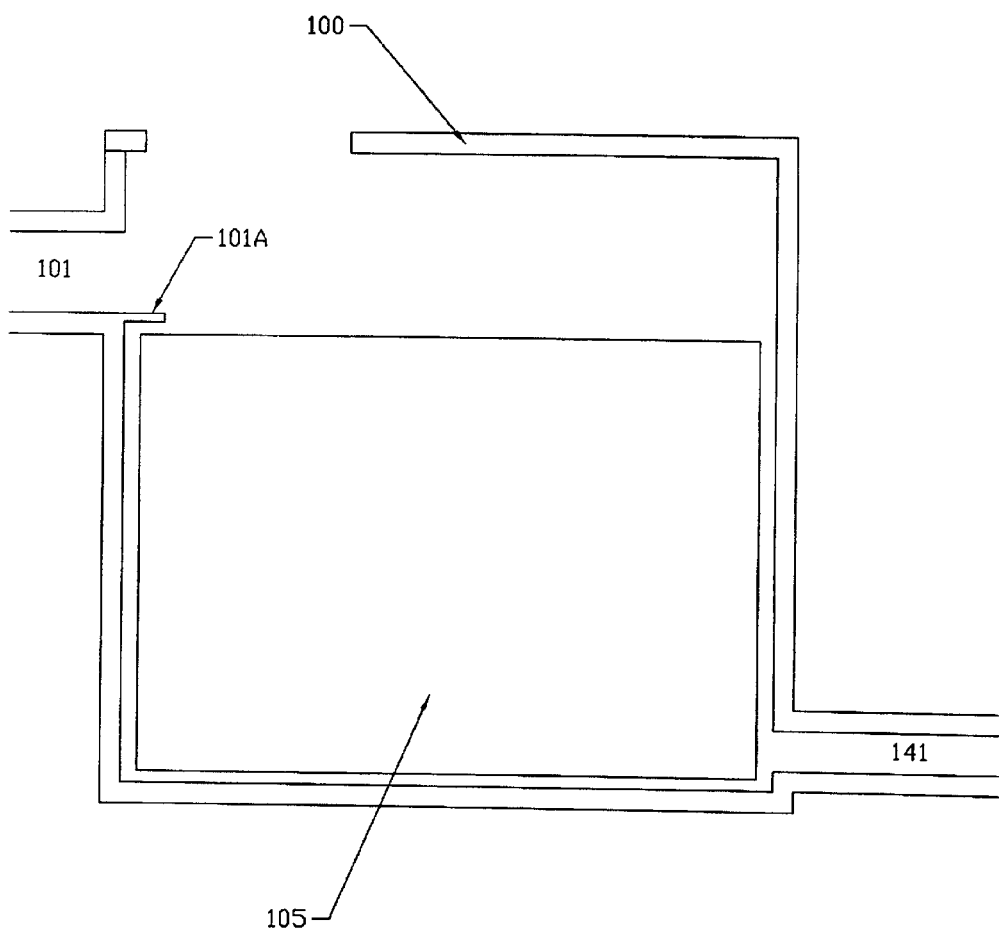
FIG. 9 is a plan view of a Second Modified Form of the Invention.
Figure 10:
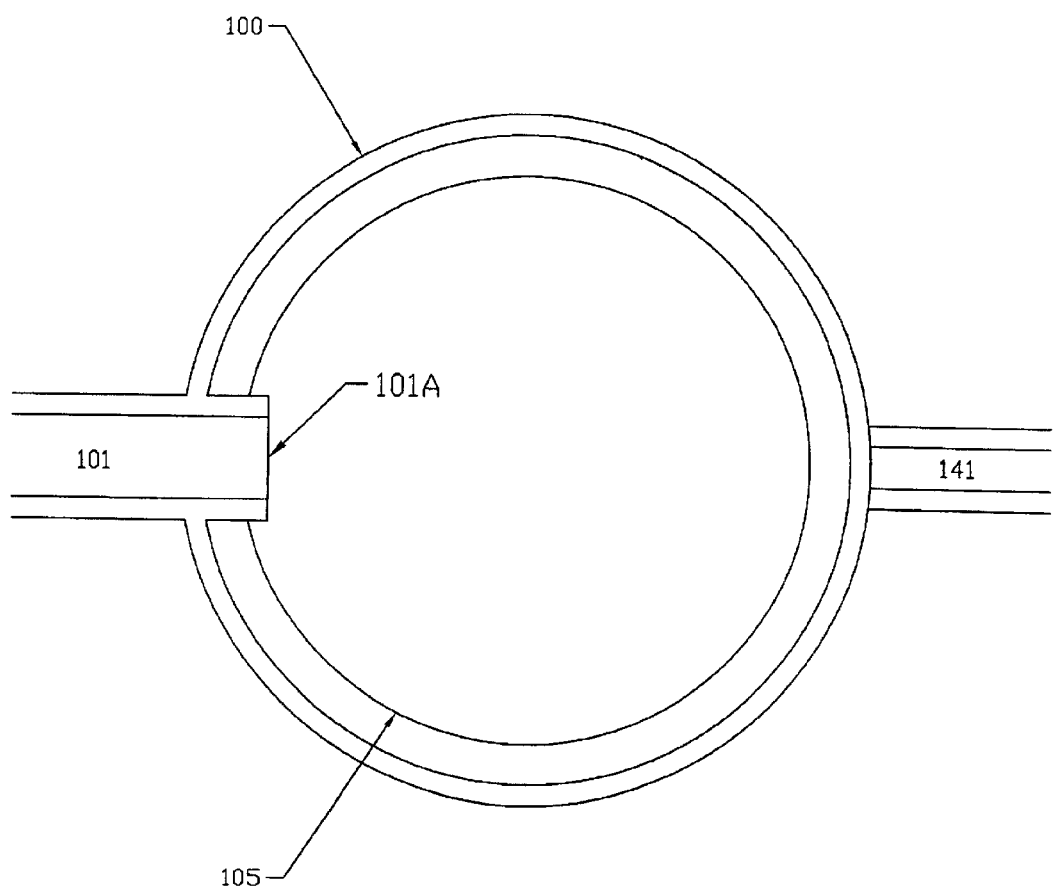
FIG. 10 is a horizontal sectional view of a Second Modified Form of the Invention.

The present invention can be configured with a single outlet pipe that conveys the filtered water during low flow rate conditions and the unfiltered water during high flow rate conditions to the same discharge point. FIGS. 9 and 10 show the arrangement of the tank and associated pipes for this form of the Invention.

In FIGS. 9 and 10, there is a tank 100 that has an inlet pipe 101 and an outlet pipe 141. The outlet pipe 140 is at a substantially lower elevation than the inlet pipe 101. There is a spillway 101A at the end of inlet pipe 101 that extends to the edge of the filter mechanism 105.

In this Second Modified Form of the Invention, the filter mechanism 105 remains unchanged from the Preferred Form of the Invention.

Operation of the Second Modified Form

When the runoff entering inlet pipe 101 has a low rate of flow, the water is passed from spillway 101A into reservoir 113 above filter mechanism 105. Because the oil entering the system is emulsified or dissolved, the oil does not remain on top of the water in reservoir 113, but is instead mixed throughout the water. From reservoir 113, the water flows into coarse material 120. Coarse material 120 has a large volume of voids and provides little resistance to the flow of water, thus the water is distributed evenly throughout coarse material 120.

As coarse material 120 becomes saturated, the runoff water will penetrate barrier 121 and enter fine filter media 122. Fine filter media 122 provides significantly more resistance to flow than does coarse material 120. Furthermore, the finer particles create a more tortuous flow path, allowing for longer contact time between the runoff water and the fine filter media 122, and therefore more efficient pollutant removal. As the fine filter media 122 slowly becomes saturated, the filtered runoff water will then penetrate barrier 123 and enter drain 124.

Drain 124 is simply an open space that allows the water to flow down along interior wall 111 or outer wall 112 to perforated plate 125. The water flows through the perforations in plate 125 and back into tank 100. From tank 100, the water enters the clean water outlet pipe 102. The clean water outlet pipe 102 delivers the filtered runoff water to a sewer or stream.

When runoff water enters the inlet pipe 101 at a high rate of flow, the fine filter media 122 restricts the flow through filter cells 110 and 110A, and therefore restricts the flow through filter mechanism 105. In this case, the excess water flows over the outer wall 112 of filter mechanism 105, and down to the floor of tank 100. From tank 100, the untreated water enters the single outlet pipe 141. The outlet pipe 141 delivers the filtered runoff water to a sewer or stream.

Detailed Description of a Third Modified Form of the Invention

The present invention can be inverted, forcing the water to flow upwards through the filter insert. FIGS. 11–14 show the configuration of the invention for this form.

Figure 11:
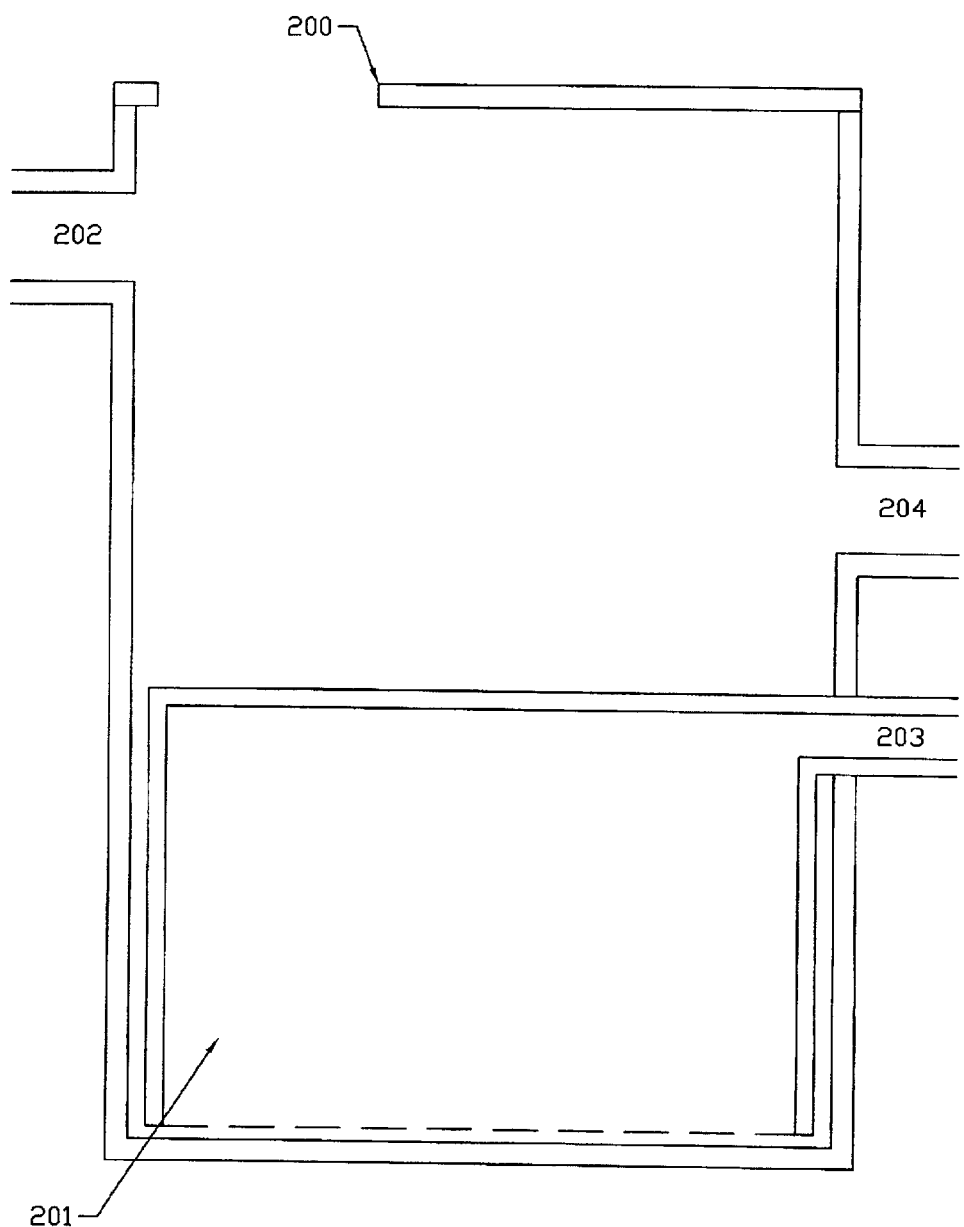
FIG. 11 is a sectional view of a Third Modified Form of the Invention.

In FIG. 11, tank 200 has a sump below the outlet pipe 203, and filter insert 201 is set in that sump. Inlet pipe 202 allows water to flow into tank 200 and into the sump. When the water level in tank 200 exceeds the elevation of clean water outlet pipe 203, water will begin to flow through filter insert 201 and into outlet pipe 203. During a flow rate which exceeds the filter capacity of filter insert 201, water will be allowed to exit tank 200 through overflow pipe 204.

Figure 12:
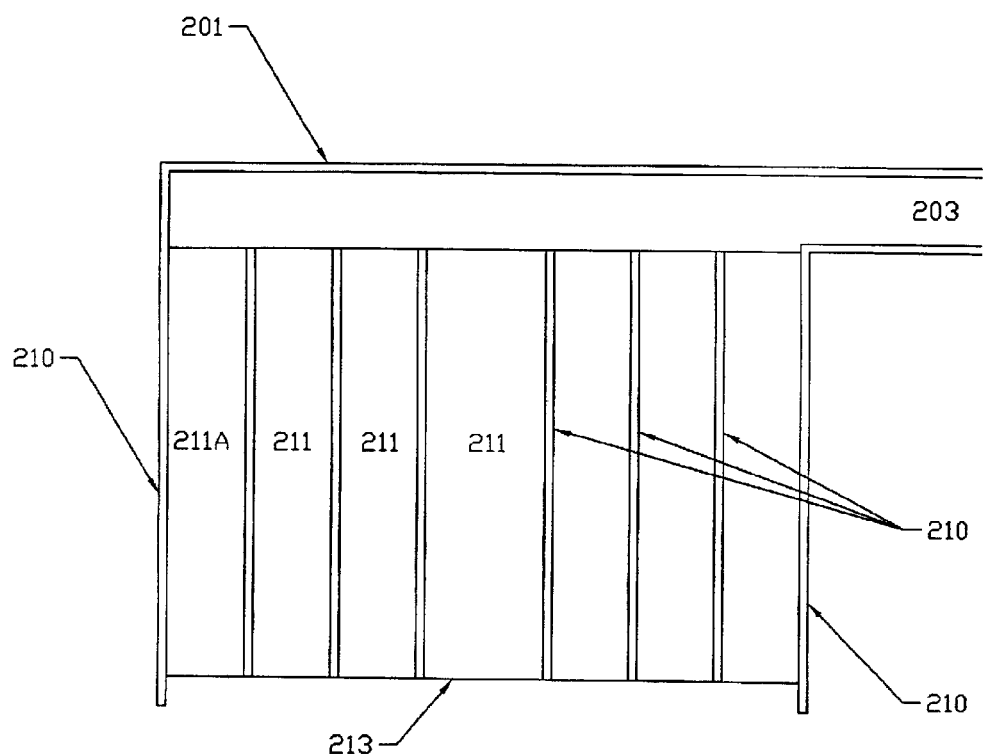
FIG. 12 is a sectional view of the filter mechanism 201 in the Third Modified Form of the Invention.

FIG. 12 shows a section of filter insert 201 and its connection to clean water outlet pipe 203. Filter insert 201 is bounded by outer walls 210, which connect to clean water outlet pipe 203. Concentric rings 211 are defined within filter insert 201 by inner walls 212, with the outer ring 211A bound by the inner wall 212 on one side and outer wall 210 on the other. Water enters filter insert 201 through a permeable bottom 213, and flows upward through filter top 214. Once clean water flows through filter top 214, it then flows by gravity through clean water outlet 203.

Figure 13:
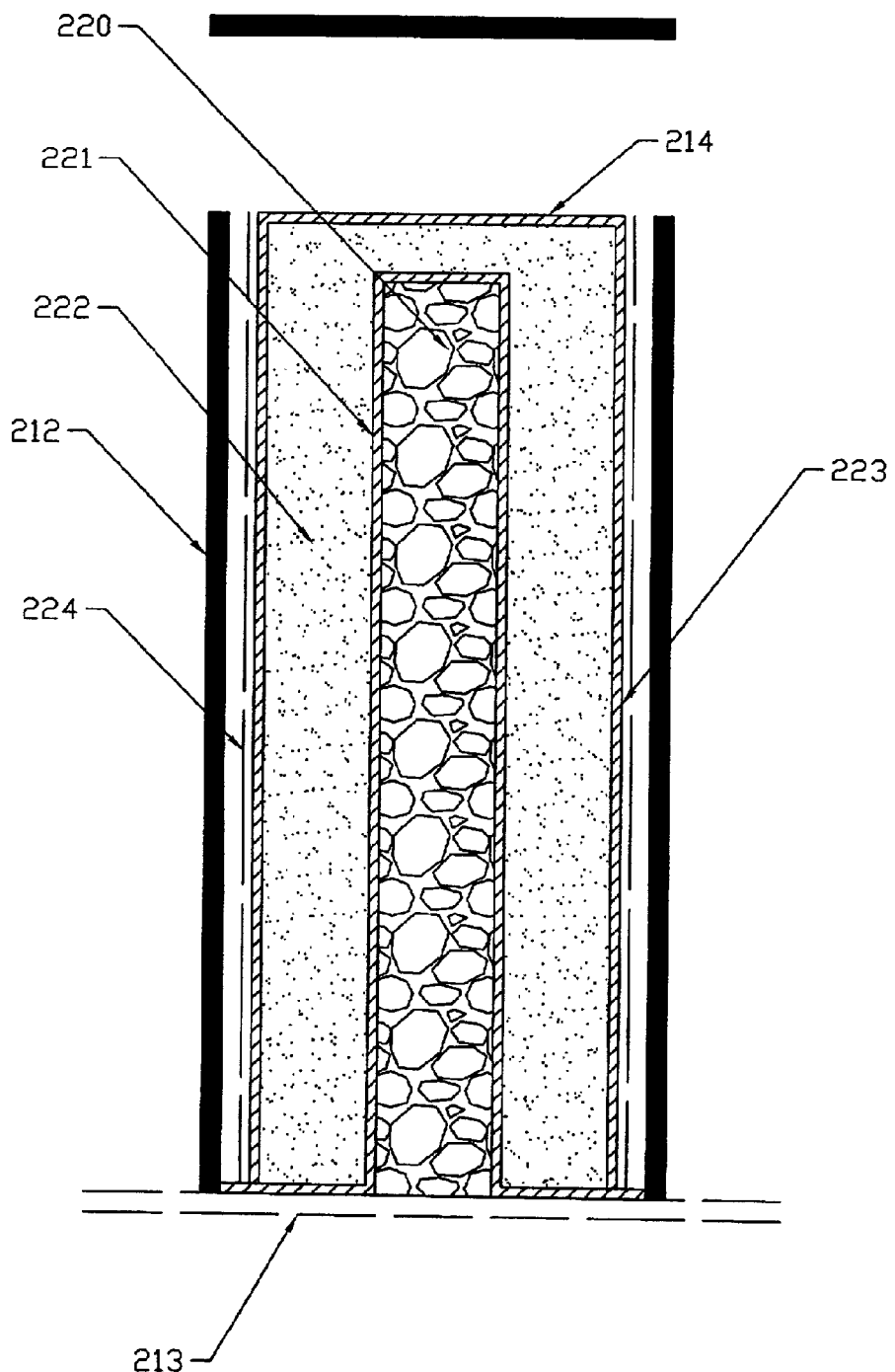
FIG. 13 is a detailed sectional view of a part of filter cell 211 in the Third Modified Form of the Invention.

FIG. 13 shows a detailed section of one of the concentric rings 211 that make up filter insert 201. The ring 211 is bounded on each side by inner wall 212. Water enters the filter cell through permeable bottom 213 and flows into the coarse filter media 220. Because of the high permeability of media 220, the water distributes itself evenly through coarse media 220 and flows from there, through permeable barrier 221, and into fine media 222. The water flows mainly horizontally through fine media 222, but near the top of the cell, water may also flow vertically through fine media 222. Once through the fine media 222, water passes through permeable barrier 223 and into vertical drain 224. Once in drain 224, the water flows upward alongside wall 212 until it reaches the top of the filter cell. At the top of the cell, water can flow over wall 212 onto the top of the adjacent cell, until it reaches the outermost filter cell.

Figure 14:
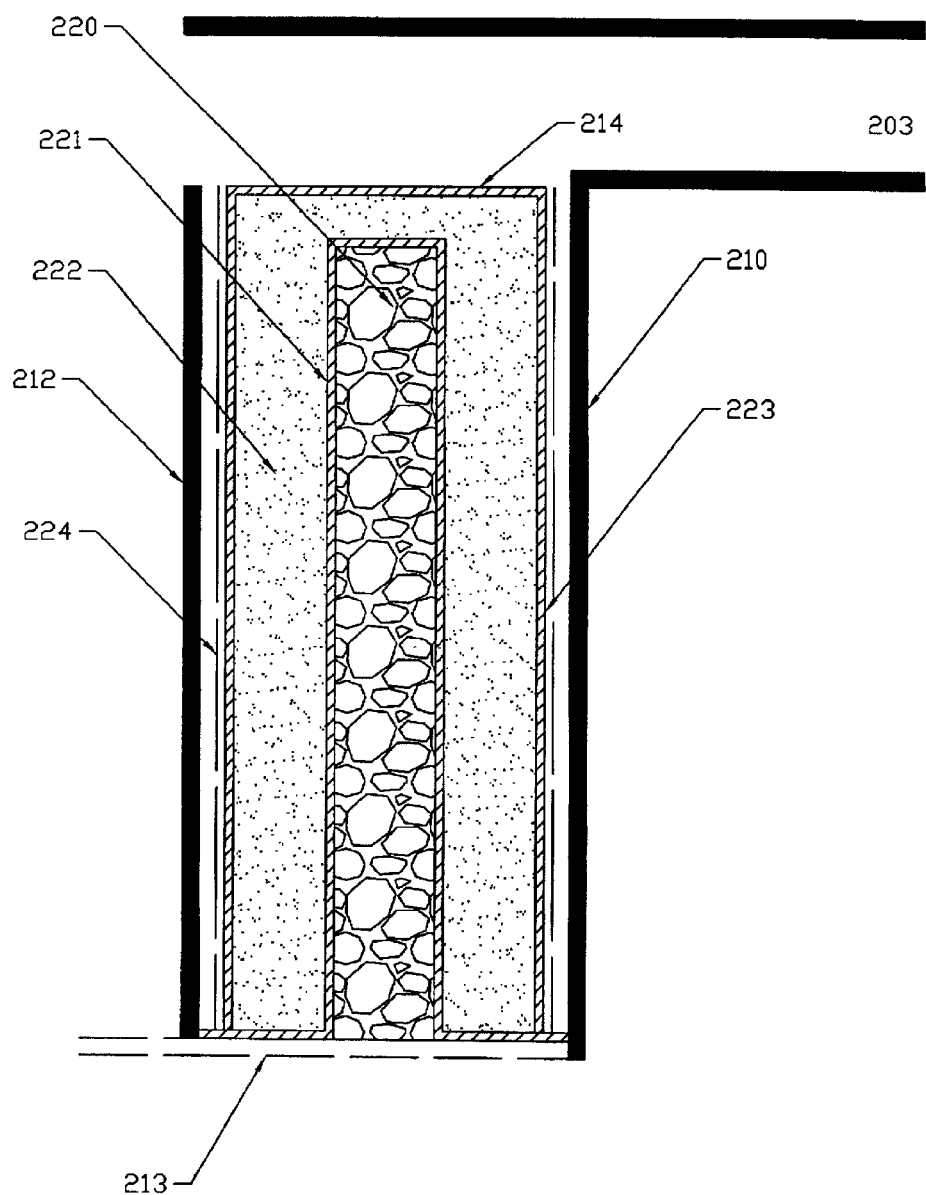
FIG. 14 is a detailed sectional view of filter cell 211A in the Third Modified Form of the Invention.

FIG. 14 shows the outermost filter cell 211A. The filter cell 211A functions the same way as the other cells 211, with the exception that it is bordered by one inner wall 212 and the outer wall 210 of filter insert 201. Water again enters the cell through permeable barrier 213, flows into coarse media 220, flows through permeable barrier 221 into fine media 222, through permeable barrier 223 into vertical drain 224, and upward to the top of the cell. From the top of filter cell 211A, the filtered water leaves the system through clean water outlet pipe 203. In addition to the water that entered filter cell 211A through permeable barrier 213, water also enters cell 211A from adjacent filter cells 211 by flowing over inner walls 212. This water also leaves filter cell 211A through an outlet conduit such as clean water outlet pipe 203.

Figure 15:
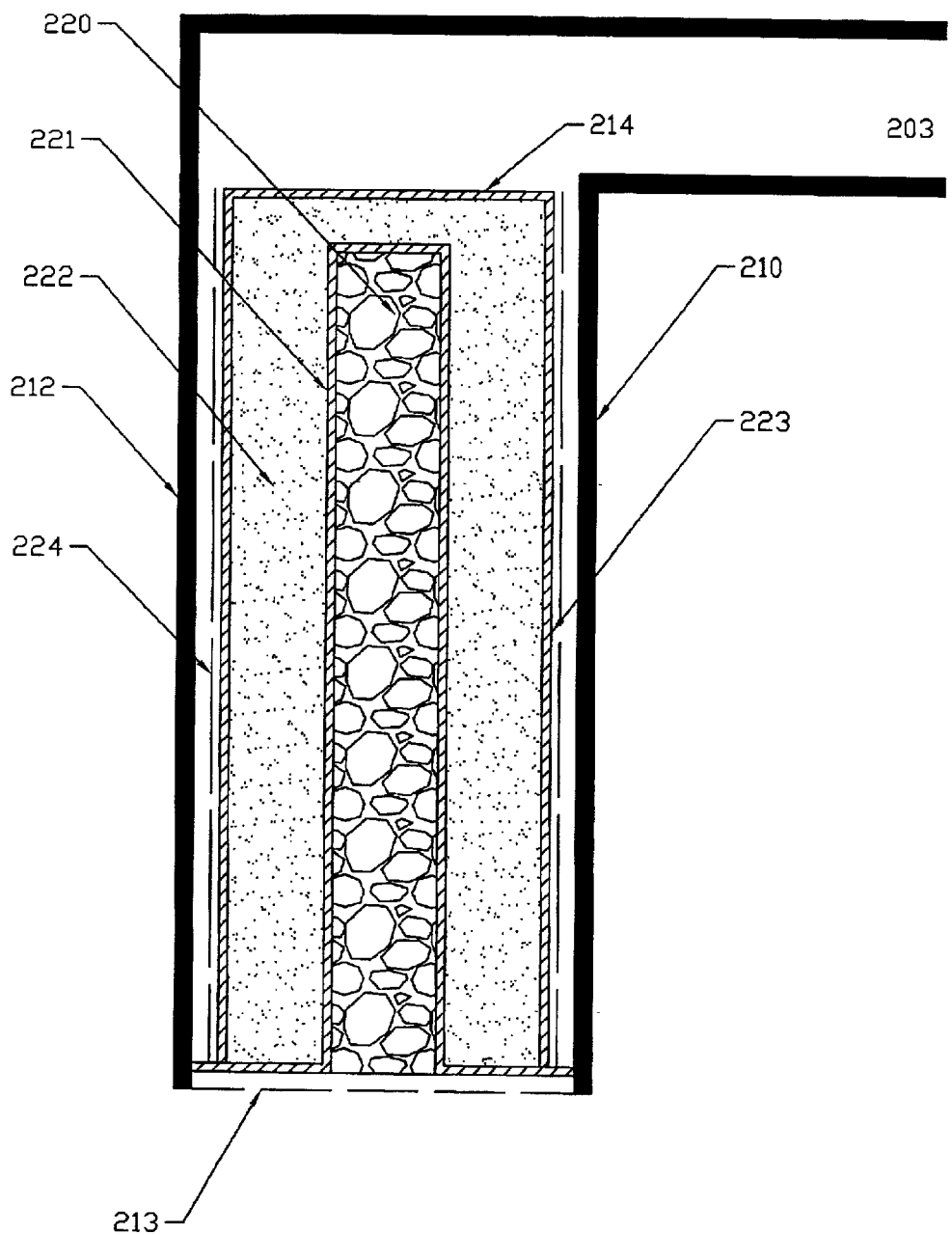
FIG. 15 is a detailed section view of a filter insert 201 which consists of only one filter cell.

FIG. 15 shows a cross section of filter insert 201 in a final modified form of the invention, in which filter insert 201 consists solely of one filter cell. The filter cell is bounded on each side by outer walls 212, and is in direct communication with clean water outlet pipe 203. Water enters the filter cell through permeable barrier 213, flows into coarse media 220, enters fine media 222 through permeable barrier 221, enters vertical drain 224 through permeable barrier 223, and flows upward until it leaves the filter cell through clean water outlet pipe 203.

I claim to have invented:
1. A filtering system comprising:
   an inlet for receiving liquid to be filtered,
   a reservoir fed by said inlet,
   an outlet for receiving fluid that overflows said reservoir,
   a plurality of adjacent filter cells fed by said reservoir,
   each filter cell having:

(a) at least first and second layers of filtering material,
(b) one of which layers receives water from said reservoir, and allows said water to pass to the other layer,
(c) the other of said layers having two vertical sides one of which sides is adjacent said one layer, and
(d) a drain adjacent the other said side of said other layer, and
an outlet for filtered water fed by said drain,
said cells being circular and concentric.

2. A filtering system as defined in claim 1, in which said cells are not only circular and concentric with each other, but are complete circles extending 360 degrees.

3. A filtering system as defined in claim 1, in which each layer of each cell is circular and concentric with all other layers of said cells.

4. A filtering system as defined in claim 3, in which each of said layers has top and bottom ends and two sides,
said one layer being open at one end to receive liquid from said reservoir and having a fluid blockade at its other end, said one layer also having a filtering material which is coarse as compared to the filtering material in the other layer,
said other layer having one of its said ends adjacent said reservoir and a fluid blockade at each of its said ends so that fluid passes from said one layer through said other layer to said drain.

5. A filtering system as defined in claim 4, in which a single outlet receives the fluid that overflows said reservoir and also receives the fluid from said drains.

6. A filtering system as defined in claim 5, in which there are more than two of said cells.

7. A filtering system as defined in claim 1, in which said reservoir is below said cells and has a conduit that extends vertically upward to thereby apply sufficient fluid pressure to the fluid in said reservoir to force said fluid under pressure through said cells, and
an output drain adjacent said second side of said second layer.

8. A filtering system as defined in claim 7, in which each layer of each cell is circular, and concentric with all other layers.

9. A filtering system as defined in claim 8, in which said drains and any fluid that overflows said reservoir, feed a common outlet.

10. A filtering system as defined in claim 9, in which there are more than two of said cells.

11. A filtering system as defined in claim 10, which each of said layers has top and bottom ends and two sides,
said one layer being open at one end to receive liquid from said reservoir and having a fluid blockade at its other end, said one layer also having a filtering material which is coarse as compared to the filtering material in the other layer,
said other layer having one of its said ends adjacent said reservoir and a fluid blockade at each of its said ends so that fluid passes from said one layer through said other layer to said drain.

12. A filtering system comprising:
an inlet for receiving fluid to be filtered,
a reservoir fed by said inlet,
an outlet for receiving fluid that overflows said reservoir,
a filter cell fed by said reservoir,
said filter cell having:
(a) at least first and second layers of filtering material, said first and second layers having a common porous sidewall,
(b) the first of which layers receives fluid from said reservoir and allows said fluid to pass through said porous sidewall to the second layer,
(c) a drain, said second layer and said drain having a common porous sidewall,
said porous sidewalls comprising a material for preventing passage of filtering material therethrough while allowing passage of fluid therethrough,
in which there are at least two of said cells and in which one of said cells completely surrounds another cell in at least one plane.

13. A filtering system comprising:
an inlet for receiving fluid to be filtered,
a reservoir fed by said inlet,
an outlet for receiving fluid that overflows said reservoir, and
a filter cell fed by said reservoir,
said filter cell having:
(a) at least first and second layers of filtering material said first and second layers having a common porous sidewall,
(b) the first of which layers receives fluid from said reservoir and allows said fluid to mass through said porous sidewall to the second layer,
(c) a drain, said second layer and said drain having a common porous sidewall,
said porous sidewalls comprising a material for preventing passage of filtering material therethrough while allowing passage of fluid therethrough,
in which said drain surrounds said layers in at least one plane.

14. A filtering system comprising:
an inlet for receiving fluid to be filtered,
a reservoir fed by said inlet,
an outlet for receiving fluid that overflows said reservoir, and
a filter cell fed by said reservoir,
said filter cell having:
(a) at least first and second layers of filtering material, said first and second layers having a common porous sidewall,
(b) the first of which layers receives fluid from said reservoir and allows said fluid to pass through said porous sidewall to the second layer,
(c) a drain, said second layer and said drain having a common porous sidewall,
said porous sidewalls comprising a material for preventing passage of filtering material therethrough while allowing passage of fluid therethrough,
in which said layers and drain are cylindrical and concentric and said drain surrounds said layers in at least one plane.

15. A filtering system, comprising:
a first filtering media,
a second filtering media that is different than said first media,
a first porous barrier that allows fluid, but not filtering media, to flow through it, separating said first and second filtering media,
a second porous barrier separating said drain from said second filtering media, said second porous barrier allowing fluid to flow through it from said second filtering media to said drain but not allowing filtering media to pass through it, and an inlet for feeding fluid to be filtered to said first filtering media, wherein said first filtering media has two sides, said second filtering media being located adjacent both of said two sides, said first porous barrier extending between said first and second media along both of said two sides.

16. A filtering system, comprising:

a first filtering media, a second filtering media that is different than said first a first porous barrier that allows fluid, but not filtering media, to flow through it, separating said first and second filtering media, a drain, a second porous barrier separating said drain from said second filtering media, said second porous barrier allowing fluid to flow through it from said second filtering media to said drain but not allowing filtering media to pass through it, and an inlet for feeding fluid to be filtered to said first filtering media, and a reservoir having a tray feeding fluid to be filtered to said first filtering media, said tray having an overflow outlet, in which said first filtering media has two sides and said first porous barrier and said second filtering media extend along both of said sides, so that fluid in said first filtering media may pass out both of its sides to said second filtering media.

17. A filtering system comprising:

a first filtering media having two sides, first and second porous barriers each of which has a first face and a second face, said first face of said first barrier covering one of said sides and the first face of the second barrier covering said other said side, a second filtering media having a first face covering the second face of said first barrier, said second filtering media having a second face, a third porous barrier that receives fluid from and covers said second face of said second filtering media, a first drain that receives fluid that has passed through said third porous barrier, a third filtering media having one face covering the second face of said second porous barrier, said third filtering media having a second face, a fourth porous barrier that receives fluid from and covers said second face of said third filtering media, and a second drain that receives fluid that passes through said fourth porous barrier.

18. A filtering system as defined in claim 17, which said second and third filtering media are interconnected and therefore comprise a continuous filtering media.

19. A filtering system as defined in claim 18, in which said first filtering media is elongated and has two ends, a fifth porous barrier covering one of said ends and a filtering media covering said barrier that covers said one end.

20. A filtering system as defined in claim 19, in which said first, second and fifth porous barriers comprise one continuous barrier.

21. A filtering system as defined in claim 17, which said second and third filtering media and said drains are circular and concentric.

22. A filtering system as defined in claim 17, in which one of said drains surrounds, in one plane, all of the other elements of said claim 17.

23. A filtering system as defined in claim 17, in which said porous barriers comprise a geotextile material that is fine enough to retain said second and third filtering media.

24. A filter for filtering a fluid comprising:

first and second filter cells each of which is a filter for said fluid and one of which cells surrounds the other in at least one plane, each said filter cell having two sides, one of which sides is an input side and one of which is an output side, each said filter cell having a drain which extends from said output side toward said input side and receives the filtered fluid and discharges the filtered fluid, said drain having two ends one of which is open to the flow of said fluid and is at said output side and the other of which ends is closed to the flow of said fluid, each said filter cell having filtering material for filtering said fluid, each said filter cell having a fluid flow path for receiving fluid to be filtered at said input side and passing said fluid through said filtering material to said drain, and means for distributing the fluid to be filtered to said cells with only a part of the total fluid being fed to each cell.

25. A filter as defined in claim 24, wherein each cell has a layer of material in which each of said cells and any layer thereof are composed of pieces that are separate from the pieces composing each other said cell.

26. A filter as defined in claim 24, in which each of said two sides of each cell is horizontal.

27. A filter as defined in claim 24, in which said fluid is a liquid and said filtering material is a material for filtering liquids.

28. A filter as defined in claim 24, in which said plane is horizontal.

29. A filter as defined in claim 24, in which said fluid is water and flows through the filter under the force of gravity, said means for distributing comprising a reservoir that places said input side under said water so that each said fluid flow path is fed with said water, each said filter cell having means for receiving the fluid to be filtered and guiding it along said fluid flow path to said drain.

30. A device for filtering a fluid, comprising:

a filter having two sides one of which is an input side for receiving the fluid to be filtered and the other of which sides is an output side for discharging the filtered fluid, said sides having a space between them, said device including a first filtering portion that extends at least most of the way from one of said sides to the other of said sides in said space, said device also having a second filtering portion surrounding said first portion in said space, means for feeding the fluid to be filtered to said portions so that each said portion receives and filters only a separate part of the fluid to be filtered and including filtering material that filters fluid passing through such portion, each said portion having a drain which receives the filtered fluid and delivers it to said output side, each said drain having an end at said output side which end is open to allow the fluid to be discharged from said drain, each drain terminating in a second end which is closed to fluid flow.

31. A device for filtering a fluid as defined in claim 30, in which said sides are horizontal.

32. A device for filtering a fluid as defined in claim 31, in which each said drain is vertical.

33. A device for filtering a fluid as defined in claim 30, in which each said portion defines a path of least resistance to the fluid to be filtered extending from said input side through said filtering material to said drain.

34. A device for filtering a fluid as defined in claim 30, in which each said portion has means for receiving the fluid to be filtered at said input side, filtering the fluid and directing it to said drain.

35. A device for filtering a fluid as defined in claim 34, in which the fluid to be filtered is a liquid and each said filtering material comprising a material for filtering a liquid.

36. A filter for filtering a fluid, comprising:
    a first layer extending around a central location in at least one plane, said first layer having a first end open to receive the fluid to be filtered and a second end located at a lower elevation than said first end and closed to the passage of fluid through said second end,
    a second layer extending, in at least said plane, around said first layer and composed of filtering material,
    a first drain extending, in at least said plane, around said second layer for discharging filtered fluid from said filter,
    a third layer extending, in said plane, around said drain, said third layer having a first end for receiving fluid to be filtered and having a second end closed to the passage of said fluid,
    a fourth layer comprising filtering material extending, in said plane, around said third layer, and
    a second drain, extending, in said plane, around said fourth layer, for discharging any fluid it receives, and
    means for feeding only a part of the fluid to be filtered to each of said first and third layers.

37. A device for filtering a fluid as defined in claim 36, in which each said layer is a separate piece of material from the material composing all other of said layers.

38. A filter as defined in claim 36, in which each said layer is composed of porous material.

39. A filter as defined in claim 36, in which said second layer is composed of means for filtering a fluid and said fourth layer is also composed of means for filtering a fluid.

40. A device for filtering a fluid as defined in claim 36, in which said first and second layers comprise means for receiving the fluid to be filtered, for passing such fluid through the filtering material of said second layer and delivering the fluid to said drain.

41. A device for filtering a fluid as defined in claim 40, in which said fluid is a liquid and said filtering material is a material that filters a liquid.

42. A device for filtering fluids as defined in claim 41, in which said fluid is runoff water and said filtering material is a material that filters runoff water.

43. A filter for filtering a fluid, comprising:
    a first layer extending around a central location in at least one plane, said first layer having a first end open to receive the fluid to be filtered and a second end located at a lower elevation than said first end and closed to the passage of fluid through said second end,
    a second layer extending, in at least said plane, around said first layer and composed of filtering material,
    a third layer extending, in said plane, around said second layer, said third layer extending, in said plane, around said second layer, said third layer having a first end for receiving fluid to be filtered and having a second end closed to the passage of said fluid, and
    a fourth layer comprising filtering material extending, in said plane, around said third layer.

44. A filter for filtering a fluid as defined in claim 43, in which said fluid is a liquid, and said material is filtering material that filters said liquid.

* * * * *